United States Patent
Yang et al.

(10) Patent No.: US 10,139,956 B2
(45) Date of Patent: Nov. 27, 2018

(54) CONTROL DEVICE FOR AN ELECTROLUMINESCENT TOUCH-CONTROL DISPLAY PANEL, TOUCH SCREEN AND DISPLAY DEVICE

(71) Applicants: Boe Technology Group Co., Ltd., Beijing (CN); Beijing Boe Optoelectronics Technology Co., Ltd., Beijing (CN)

(72) Inventors: Shengji Yang, Beijing (CN); Boya Zhang, Beijing (CN); Xue Dong, Beijing (CN); Zhaohui Meng, Beijing (CN); Xiaochuan Chen, Beijing (CN); Haisheng Wang, Beijing (CN); Wei Sun, Beijing (CN); Dong Chen, Beijing (CN); Kwanggyun Jang, Beijing (CN)

(73) Assignees: BOE Technology Group Co., Ltd., Beijing (CN); Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/516,064

(22) PCT Filed: Sep. 5, 2016

(86) PCT No.: PCT/CN2016/098039
§ 371 (c)(1),
(2) Date: Mar. 31, 2017

(87) PCT Pub. No.: WO2017/084414
PCT Pub. Date: May 26, 2017

(65) Prior Publication Data
US 2017/0357363 A1 Dec. 14, 2017

(30) Foreign Application Priority Data
Nov. 20, 2015 (CN) .......................... 2015 1 0811844

(51) Int. Cl.
*G06F 3/041* (2006.01)
*G09G 3/3208* (2016.01)

(52) U.S. Cl.
CPC .......... *G06F 3/0416* (2013.01); *G06F 3/0412* (2013.01); *G09G 3/3208* (2013.01)

(58) Field of Classification Search
CPC ...... G06F 3/0412; G06F 3/0416; G09G 3/016
(Continued)

(56) References Cited

U.S. PATENT DOCUMENTS 5,177,621 A * 1/1993 Ohtaki ............... H04N 1/00002
358/405
5,586,250 A * 12/1996 Carbonneau .......... G06F 3/0607
714/44
(Continued)

FOREIGN PATENT DOCUMENTS

| CN | 103345901 | 10/2013 |
| CN | 103383837 | 11/2013 |

(Continued)

OTHER PUBLICATIONS

International Search Report and Written Opinion from PCT/CN16/98039 dated Nov. 30, 2016.

*Primary Examiner* — Prabodh M Dharia
(74) *Attorney, Agent, or Firm* — Calfee, Halter & Griswold LLP

(57) ABSTRACT

A control device for an electroluminescent touch-control display panel is described, in order to implement display and touch control on an In-cell electroluminescent touch-control display panel. The control device includes a display driving circuit board, a touch-control driving circuit board, a lighting circuit board and a switching circuit board. There is also described a touch screen including an electroluminescent (Continued)

touch-control display panel and the control device, and a display device including the touch screen.

17 Claims, 3 Drawing Sheets

(58) Field of Classification Search
USPC .................. 345/156–184; 358/405; 705/35
See application file for complete search history.

(56) References Cited

U.S. PATENT DOCUMENTS

| | | | | |
|---|---|---|---|---|
| 6,265,984 | B1* | 7/2001 | Molinaroli | A63H 33/40 340/815.4 |
| 6,424,094 | B1* | 7/2002 | Feldman | G06F 3/0412 315/169.3 |
| 2006/0155619 | A1* | 7/2006 | Rhiando | G06Q 20/347 705/35 |
| 2008/0232980 | A1* | 9/2008 | Huang | F04B 49/00 417/282 |
| 2009/0009477 | A1* | 1/2009 | Yukawa | G06F 1/1601 345/168 |
| 2010/0120005 | A1* | 5/2010 | Abouelsaadat | A47G 33/008 434/245 |
| 2012/0313866 | A1 | 12/2012 | Ha et al. | |
| 2014/0022390 | A1* | 1/2014 | Blank | B60R 1/12 348/148 |
| 2014/0218856 | A1* | 8/2014 | Raff | G06F 1/1637 361/679.21 |
| 2015/0261377 | A1* | 9/2015 | Reynolds | G06F 3/0416 345/174 |
| 2015/0262528 | A1* | 9/2015 | Takahara | G09G 3/3225 345/212 |
| 2015/0317932 | A1* | 11/2015 | Zhou | G09G 3/32 345/173 |
| 2016/0070130 | A1* | 3/2016 | Yuminami | G02F 1/13452 349/110 |
| 2016/0364081 | A1* | 12/2016 | Ludden | G06F 3/044 |
| 2016/0374641 | A1* | 12/2016 | Ancar | A61B 6/587 378/206 |
| 2017/0090615 | A1* | 3/2017 | Bohannon | G06F 3/044 |
| 2017/0168646 | A1* | 6/2017 | Yang | G06F 3/0412 |

FOREIGN PATENT DOCUMENTS

| | | |
|---|---|---|
| CN | 104238787 | 12/2014 |
| CN | 104779267 | 7/2015 |
| CN | 104898888 | 9/2015 |
| CN | 104991683 | 10/2015 |

* cited by examiner

CONTROL DEVICE FOR AN ELECTROLUMINESCENT TOUCH-CONTROL DISPLAY PANEL, TOUCH SCREEN AND DISPLAY DEVICE

RELATED APPLICATIONS

The present application is the U.S. national phase entry of PCT/CN2016/098039, with an international filing date of Sep. 5, 2016, which claims the benefit of Chinese Patent Application No. 201510811844.9, filed on Nov. 20, 2015, the entire disclosures of which are incorporated herein by reference.

TECHNICAL FIELD

The present disclosure relates to the technical field of touch-control display, and particularly to a control device for an electroluminescent touch-control display panel, a touch screen and a display device.

BACKGROUND

Currently, a common built-in touch screen is implemented based on a liquid crystal display (LCD) panel, i.e., a touch sensor is built into a liquid crystal display screen, which can save the cost of materials and can make the screen lighter and thinner on the basis of enabling a touch-control function, and which is more important for an electroluminescent display panel using organic light-emitting diodes (OLED) highlighted by being light and thin.

Currently, major touch-control solutions for an OLED panel are One Glass Solution (OGS) and On-cell. OGS is to integrate a protective glass layer and a touch-control layer, whereas On-cell is to directly manufacture a touch-control thin film on the upper substrate baseplate of a display panel. Compared to In-cell, these two solutions are not advantageous in making the panel light and thin.

Therefore, how to implement In-cell based on an OLED panel is an urgent technical problem for those skilled in the art to solve.

SUMMARY

In embodiments of the present disclosure, a control device for an electroluminescent touch-control display panel, a touch screen and a display device are provided, in order to implement display and touch control on an In-cell electroluminescent touch-control display panel.

In an embodiment of the present disclosure, there is provided a control device for an electroluminescent touch-control display panel comprising a display driving circuit board electrically connected to the electroluminescent touch-control display panel, a touch-control driving circuit board, a lighting circuit board, and a switching circuit board electrically connected respectively to the display driving circuit board, the touch-control driving circuit board and the lighting circuit board. The lighting circuit board is configured to provide a first reference signal to the touch-control driving circuit board via the switching circuit board. The touch-control driving circuit board is configured to gate, during the touch-control period, a generated touch-control excitation signal and then transmit the touch-control excitation signal to the display driving circuit board via the switching circuit board, and determine a position of touch control in the electroluminescent touch-control display panel in accordance with a feedback signal transmitted by the display driving circuit board; and gate, during the display period, the first reference signal provided by the lighting circuit board and then transmit the first reference signal to the display driving circuit board via the switching circuit board. The display driving circuit board is configured to during the touch-control period, transmit the excitation signal, transmitted by the touch-control driving circuit board, to a cathode multiplexed as a touch-control electrode in the electroluminescent touch-control display panel, and transmit a feedback signal received from the cathode multiplexed as the touch-control electrode in the electroluminescent touch-control display panel to the touch control driving circuit board via the switching circuit board; and during the display period, transmit the first reference signal, transmitted by the touch-control driving circuit board, to the cathode multiplexed as the touch-control electrode in the electroluminescent touch-control display panel.

In certain exemplary embodiments of the control device, the display driving circuit board comprises: a display driving circuit and a first switching circuit; and the touch-control driving circuit board comprises: a first modulation circuit, a first gating circuit, an enable signal generation circuit and a touch-control detection circuit. The display driving circuit is configured to transmit a synchronization signal to the enable signal generation circuit via the switching circuit board. The enable signal generation circuit is configured to generate a first enable signal and a second enable signal; under the control of the synchronization signal transmitted by the display driving circuit board, transmit the first enable signal to the first gating circuit during the display period, and transmit the second enable signal to the first gating circuit during the touch-control period. The first modulation circuit is configured to generate a first square-wave signal as a touch-control excitation signal, and transmit the touch-control excitation signal to the first gating circuit. The first gating circuit is configured to receive the excitation signal and the first reference signal provided by the lighting circuit board; upon receiving the first enable signal, gate the first reference signal and then output the first reference signal to the first switching circuit via the switching circuit board; and upon receiving the second enable signal, gate the touch-control excitation signal and then output the touch-control excitation signal to the first switching circuit via the switching circuit board. The first switching circuit is configured to forward the first reference signal or the touch-control excitation signal received from the first gating circuit to a first reference signal port connected to the cathode in the electroluminescent touch-control display panel; and forward a feedback signal, received from the first reference signal port connected to the cathode in the electroluminescent touch-control display panel, to the touch-control detection circuit via the switching circuit board. The touch-control detection circuit is configured to determine a position of touch control in the electroluminescent touch-control display panel in accordance with the feedback signal.

In certain exemplary embodiments of the control device, the display driving circuit board further comprises: a second switching circuit; and the touch-control driving circuit board further comprises: a second modulation circuit and a second gating circuit. The display driving circuit is further configured to transmit a gate driver circuit on array (GOA) signal to the second gating circuit and the second modulation circuit via the switching circuit board. The enable signal generation circuit is further configured to under the control of the synchronization signal transmitted by the display driving circuit, transmit the first enable signal to the second gating circuit during the display period, and transmit the second enable signal to the second gating circuit during the touch-control period. The second modulation circuit is configured to generate a second square-wave signal benchmarked against a voltage of the GOA signal in accordance with the GOA signal, and transmit the second square-wave signal to the second gating circuit. The second gating circuit is configured to receive the GOA signal and the second square-wave signal, and upon receiving the first enable signal, gate the GOA signal and then output the GOA signal to the second switching circuit via the switching circuit board, and upon receiving the second enable signal, gate the second square-wave signal and then output the second square-wave signal to the second switching circuit via the switching circuit board. The second switching circuit is configured to transmit the received GOA signal or the second square-wave signal to a signal port of a GOA circuit in the electroluminescent touch-control display panel.

In certain exemplary embodiments of the control device, an amplitude of the second square-wave signal generated by the second modulation circuit is the same as that of the first square-wave signal generated by the first modulation circuit.

In certain exemplary embodiments of the control device, the display driving circuit is further configured to transmit a data signal to a data signal port of a pixel circuit in the electroluminescent touch-control display panel during the display period only.

In certain exemplary embodiments of the control device, the enable signal generation circuit is further configured to under the control of the synchronization signal transmitted by the display driving circuit, transmit the first enable signal to the display driving circuit via the switching circuit board during the display period, and transmit the second enable signal to the display driving circuit via the switching circuit board during the touch-control period. The display driving circuit is configured to upon receiving the first enable signal, transmit the data signal to the data signal port of the pixel circuit in the electroluminescent touch-control display panel, and upon receiving the second enable signal, stop transmitting the data signal to the data signal port of the pixel circuit in the electroluminescent touch-control display panel.

In certain exemplary of embodiments of the control device, the display driving circuit board further comprises: a third switching circuit; and the touch-control driving circuit board further comprises: a third modulation circuit and a third gating circuit. The lighting circuit board is further configured to provide a second reference signal to the third gating circuit and the third modulation circuit via the switching circuit board. The enable signal generation circuit is further configured to under the control of the synchronization signal transmitted by the display driving circuit, transmit the first enable signal to the third gating circuit during the display period, and transmit the second enable signal to the third gating circuit during the touch-control period. The third modulation circuit is configured to generate a third square-wave signal benchmarked against a voltage of the second reference signal in accordance with the second reference signal, and transmit the third square-wave signal to the third gating circuit. The third gating circuit is configured to: receive the second reference signal and the third square-wave signal, and upon receiving the first enable signal, gate the second reference signal and then output the second reference signal to the third switching circuit via the switching circuit board, and upon receiving the second enable signal, gate the third square-wave signal and then output the third square-wave signal to the third switching circuit via the switching circuit board. The third switching circuit is configured to transmit the received second reference signal or the third square-wave signal, to a second reference signal port of the pixel circuit in the electroluminescent touch-control display panel.

In certain exemplary embodiments of the control device, an amplitude of the third square-wave signal generated by the third modulation circuit is the same as that of the first square-wave signal generated by the first modulation circuit.

In an embodiment of the present disclosure, there is provided a touch screen comprising an electroluminescent touch-control display panel, and any control circuit for an electroluminescent touch-control display panel provided by an embodiment of the present disclosure. The cathode in the electroluminescent touch-control display panel is segmented into a plurality of touch-control electrodes arranged in arrays and independent from each other.

In an embodiment of the present disclosure, there is provided a display device comprising the above touch screen provided by an embodiment of the present disclosure.

DETAILED DESCRIPTION

In the following, the specific implementation of the control device for an electroluminescent touch-control display panel, the touch screen and the display device provided by the embodiments of the present disclosure are to be described in detail in conjunction with the accompanying drawings.

Figure 1:
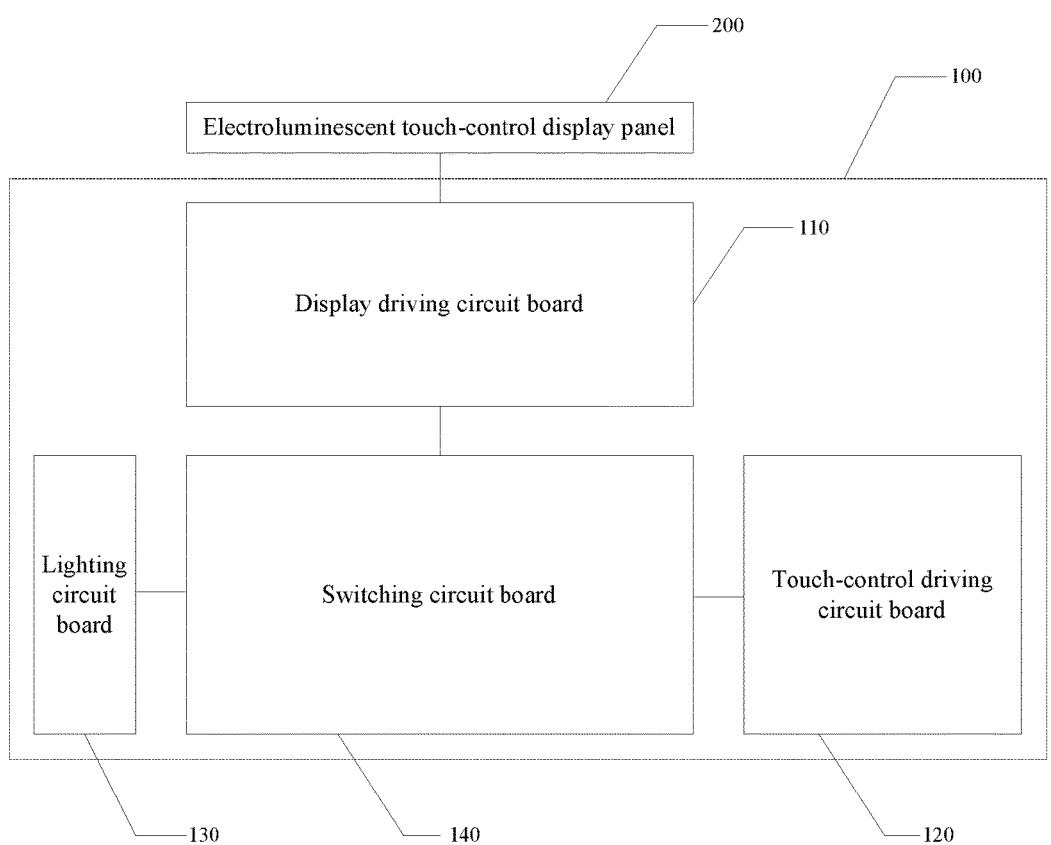
FIG. 1 is a schematic block diagram of the structure of a control device for an electroluminescent touch-control display panel according to an embodiment of the present disclosure.

An embodiment of the present disclosure provides a control device 100 for an electroluminescent touch-control display panel, as shown in FIG. 1, which comprises: a display driving circuit board 110 electrically connected to an electroluminescent touch-control display panel 200, a touch-control driving circuit board 120, a lighting circuit board 130, and a switching circuit board 140 electrically connected respectively to the display driving circuit board 110, the touch-control driving circuit board 120 and the lighting circuit board 130; wherein, the lighting circuit board 130 is configured to provide a first reference signal to the touch-control driving circuit board 120 via the switching circuit board 140;

the touch-control driving circuit board 120 is configured to: during the touch-control period, gate a generated touch-control excitation signal and then transmit the touch-control excitation signal to the display driving circuit board 110 via the switching circuit board 140, and determine a position of touch control in the electroluminescent touch-control display panel 200 in accordance with a feedback signal transmitted by the display driving circuit board 110; and during the display period, gate the first reference signal provided by the lighting circuit board 130 and then transmit the first reference signal to the display driving circuit board 110 via the switching circuit board 140;

the display driving circuit board 110 is configured to: during the touch-control period, transmit the excitation signal, transmitted by the touch-control driving circuit board 120, to a cathode multiplexed as a touch-control electrode in the electroluminescent touch-control display panel 200, and transmit a feedback signal received from the cathode multiplexed as the touch-control electrode in the electroluminescent touch-control display panel 200 to the touch-control driving circuit board 120 via the switching circuit board 140; and during the display period, transmit the first reference signal provided by the touch-control driving circuit board 120 to the cathode multiplexed as the touch-control electrode in the electroluminescent touch-control display panel 200.

The switching circuit board 140 and the lighting circuit board 130 are connected by a buffer board connector; the switching circuit board 140 and the display driving circuit board 110 are connected by an FOB bonding connector; the electroluminescent touch-control display panel 200 and the display driving circuit board 110 are connected by an FOG bonding connector; and, the switching circuit board 140 and the touch-control driving circuit board 120 are connected by two bonding connectors.

The above control device provided by an embodiment of the present disclosure is to control an OLED panel structure with a common cathode for both display and touch control, i.e., the cathode in the OLED panel is segmented into a plurality of touch-control electrodes arranged in arrays and independent from each other. In a display period of one frame, a first reference signal is loaded simultaneously to each touch-control electrode of the OLED, and the first reference signal is usually a low level signal VSS. In a non-display period of one frame, i.e., a touch-control period, a touch-control excitation signal is loaded simultaneously to each touch-control electrode of the OLED, and a feedback signal from each touch-control electrode is received in a separate channel and at separate time, and the feedback signal is detected to determine a position of the touch control.

In the above control device provided by an embodiment of the present disclosure, a touch-control driving circuit board 120 for implementing a touch-control function is added on the basis of a control device for a display panel with display function. The touch-control driving circuit board may be implemented by a Field Programmable Gate Array (FPGA). Further, a switching circuit board 140 to connect the touch-control driving circuit board 120 respectively to the lighting circuit board 130 and the display control circuit board is also added. On such basis, the transferring and processing of signals in each circuit board change correspondingly. The process of transferring and processing the signals is as follows:

Firstly, the lighting circuit board 130 provides a first reference signal to the touch-control driving circuit board 120 via the switching circuit board 140. During the display period, the touch-control driving circuit board 120 gates the first reference signal provided by the lighting circuit board 130 and then transmits the first reference signal to the display driving circuit board 110 via the switching circuit board 140. Then, the display driving circuit board 110 transmits the first reference signal to a cathode multiplexed as a touch-control electrode in the electroluminescent touch-control display panel 200, in order to implement normal display. During the touch-control period, the touch-control driving circuit board 120 gates a generated touch-control excitation signal and then transmits the touch-control excitation signal to the display driving circuit board 110 via the switching circuit board 140. Then, the display driving circuit board 110 transmits the excitation signal to the cathode multiplexed as the touch-control electrode, and transmits a feedback signal received from the cathode to the touch-control driving circuit board 120 via the switching circuit board 140, and the touch-control driving circuit board 120 determines a position of touch control in the electroluminescent touch-control display panel 200 in accordance with the feedback signal, in order to implement a touch-control detection.

In the following, the specific structures of each circuit board in the above control device provided by an embodiment of the present disclosure are to be described in detail.

Figure 2:
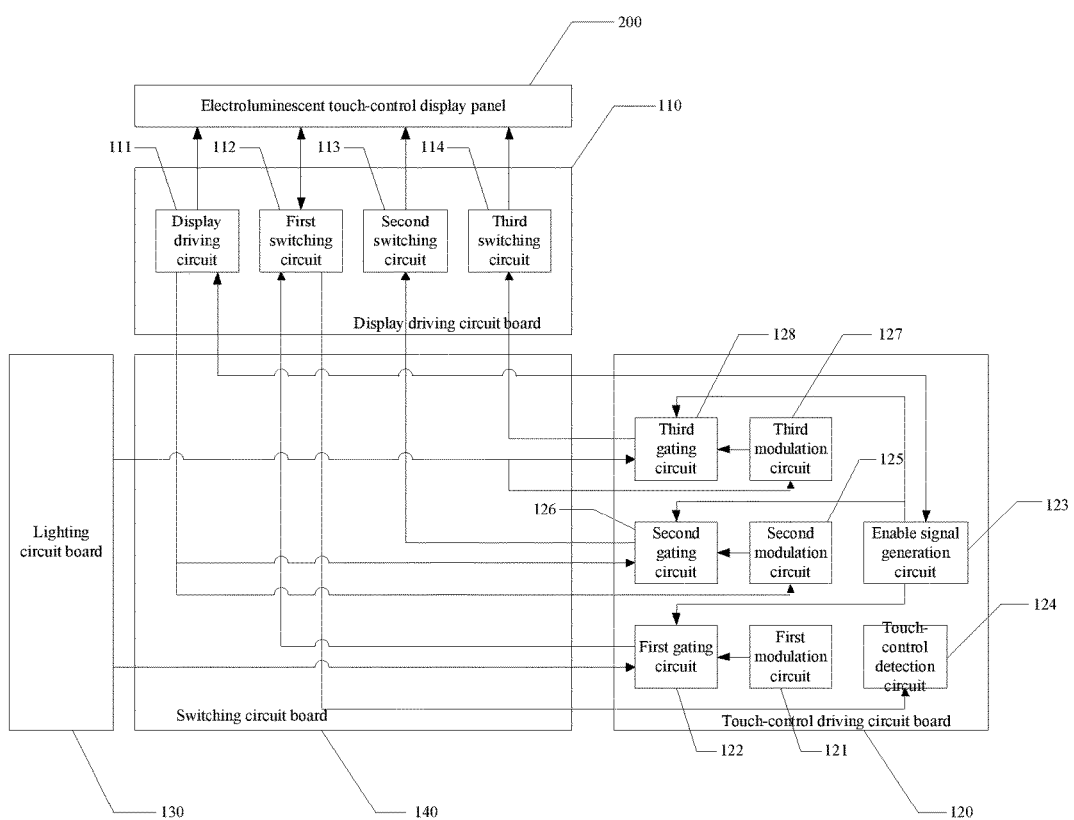
FIG. 2 is an exemplary diagram of the structure of a control device for an electroluminescent touch-control display panel according to an embodiment of the present disclosure.

The display driving circuit board 110 in the above control device provided by an embodiment of the present disclosure, as shown in FIG. 2, may comprise: a display driving circuit 111 and a first switching circuit 112; and correspondingly, the touch-control driving circuit board 120 may specifically comprise: a first modulation circuit 121, a first gating circuit 122, an enable signal generation circuit 123 and a touch-control detection circuit 124.

The display driving circuit 111 (Driver IC) is configured to transmit a synchronization TE signal to the enable signal generation circuit 123 via the switching circuit board 140, which signal is used for controlling the switch of the time sequences of display and touch control.

The enable signal generation circuit 123 is configured to: generate a first enable signal and a second enable signal; under the control of the synchronization signal transmitted by the display driving circuit 111, transmit a first enable EN1 signal to the first gating circuit 122 during the display period, and transmit a second enable EN2 signal to the first gating circuit 122 during the touch-control period.

The first modulation circuit 121 is configured to generate a first square-wave signal as a touch-control excitation signal and transmit the touch-control excitation signal to the first gating circuit 122.

The first gating circuit 122 is configured to: receive the excitation signal and the first reference signal transmitted by the lighting circuit board 130; upon receiving the first enable signal, gate the first reference signal and then output the first reference signal to the first switching circuit 112 via the switching circuit board 140; and upon receiving the second enable signal, gate the touch-control excitation signal and then output the touch-control excitation signal to the first switching circuit 112 via the switching circuit board 140.

The first switching circuit 112 is configured to forward the first reference signal or touch-control excitation signal received from the first gating circuit 122 to the first reference signal port connected to the cathode in the electroluminescent touch-control display panel 200; forward the feedback signal received from the first reference signal port, connected to the cathode in the electroluminescent touch-control display panel 200, to the touch-control detection circuit 124 via the switching circuit board 140.

The touch-control detection circuit 124 is configured to determine a position of touch control in the electroluminescent touch-control display panel 200 in accordance with the feedback signal.

Generally, in the above control device provided by an embodiment of the present disclosure, the lighting circuit board 130 is connected to a lighting machine that provides an electric Power signal and an MIPI signal to the lighting circuit board 130, wherein, the Power signal is used for providing an electrical signal to a DCDC module in the lighting circuit board 130 and the display driving circuit 111 in the display driving circuit board 110 respectively.

The MIPI signal transmitted by the lighting machine is transmitted to the display driving circuit 111 via the switching circuit board 140, and the display driving circuit 111 generates a TE signal in accordance with the MIPI signal. The display driving circuit 111 transmits the TE signal to the enable signal generation circuit 123 via the switching circuit board 140; and in accordance with the TE signal, the enable signal generation circuit 123 transmits an EN1 signal to the first gating circuit 122 during the display period and transmits an EN2 signal to the first gating circuit 122 during the touch-control period, respectively. The first gating circuit 122 performs the corresponding signal gating functions in accordance with the received EN1 signal or EN2 signal.

In the lighting circuit board 130, the DCDC module is used for generating two output voltage signals as a first reference signal VSS and a second reference signal VDD respectively; wherein, the first reference signal is used for being loaded to a first reference signal port connected to the cathode in each pixel circuit of the electroluminescent touch-control display panel 200 during the display period, and the second reference signal is used for being loaded to a second reference signal port in each pixel circuit of the electroluminescent touch-control display panel 200 during the display period.

The first reference signal generated by the DCDC module in the lighting circuit board 130 is transmitted to the first gating circuit 122 in the touch-control driving circuit board 120 via the switching circuit board 140. During the display period, when the first gating circuit 122 receives the EN1 signal, the first reference signal is gated through the first gating circuit 122 and then is transmitted to the first switching circuit 112 in the display driving circuit board 110 via the switching circuit board 140. The first switching circuit 112 is connected to the first reference signal port which is connected to the cathode in the electroluminescent touch-control display panel 200, and directly transmits the received first reference signal to each first reference signal port during the display period. During the touch-control period, when the first gating circuit 122 receives the EN2 signal, the touch-control excitation signal transmitted by the first modulation circuit 121 is gated and then is transmitted to the first switching circuit 112 in the display driving circuit board 110 via the switching circuit board 140. The first switching circuit 112 transmits the received touch-control excitation signal to each first reference signal port and then receives a feedback signal from the first reference signal port connected to the cathode in a separate channel and at separate time, and forwards the feedback signal to the touch-control detection circuit 124 via the switching circuit board 140 for touch-control detection.

Optionally, in the above control device provided by an embodiment of the present disclosure, besides generating the TE signal, the display driving circuit 111 in the display driving circuit board 110 is further configured to provide a required GOA signal to a gate driver circuit on array (GOA) in the electroluminescent touch-control display panel 200. The GOA signal is a signal having one of a variety of different voltages required to be provided to the GOA circuit, such as a clock CLK signal, a high level VGH signal, a low level VGL signal, etc. During the touch-control period, in order to reduce the earth capacity between the touch-control excitation signal loaded to the cathode in the electroluminescent touch-control display panel and the GOA signal, the GOA signal provided by the display driving circuit 111 needs to be modulated. Therefore, after the GOA signal is generated by the display driving circuit 111, the GOA signal needs to be gated and modulated through the touch-control driving circuit board 120 before it can be transmitted to the signal port corresponding to the GOA circuit in the electroluminescent touch-control display panel.

On such basis, in the above control device provided by an embodiment of the present disclosure, the display driving circuit board 110, as shown in FIG. 2, may further comprise: a second switching circuit 113; correspondingly, the touch-control driving circuit board 120, as shown in FIG. 2, may further comprise: a second modulation circuit 125 and a second gating circuit 126.

The display driving circuit 111 is further configured to transmit the GOA signal to the second gating circuit 126 and the second modulation circuit 125 via the switching circuit board 140.

The enable signal generation circuit 123 is further configured to: under the control of the synchronization signal transmitted by the display driving circuit 111, transmit a first enable signal to the second gating circuit 126 during the display period, and transmit a second enable signal to the second gating circuit 126 during the touch-control period.

The second modulation circuit 125 is configured to generate a second square-wave signal benchmarked against the voltage of the GOA signal in accordance with the GOA signal, and transmit the second square-wave signal to the second gating circuit 126.

The second gating circuit 126 is configured to: receive the GOA signal and the second square-wave signal and upon receiving the first enable signal, gate the GOA signal and then output the GOA signal to the second switching circuit 113 via the switching circuit board 140, and upon receiving the second enable signal, gate the second square-wave signal and then output the second square-wave signal to the second switching circuit 113 via the switching circuit board 140.

The second switching circuit 113 is configured to transmit the received GOA signal or second square-wave signal to the signal port of the GOA circuit in the electroluminescent touch-control display panel 200.

After generating the GOA signal, the display driving circuit 111 does not transmit it directly to the electroluminescent touch-control display panel 200, but to the touch-control driving circuit board 120 via the switching circuit board 140, and the GOA signal is to be gated during the display period by the second gating circuit 126 and then transmitted to the signal port of the GOA circuit in the electroluminescent touch-control display panel 200 via the second switching circuit 113, thereby realizing a normal display drive. The second modulation circuit 125 modulates the GOA signal transmitted by the display driving circuit 111 to generate a corresponding square-wave signal, and the square-wave signal is to be gated, during the touch-control period, by the second gating circuit 126 and transmitted to the signal port of the GOA circuit in the electroluminescent touch-control display panel 200 via the second switching circuit 113.

Figure 3:
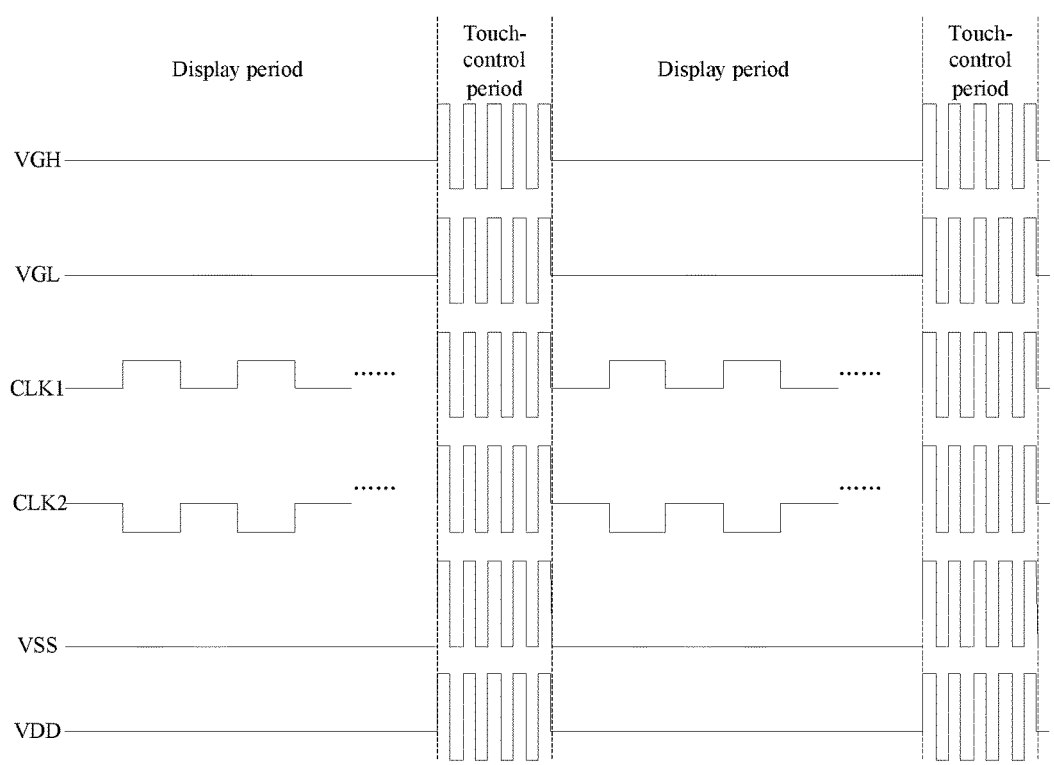
FIG. 3 is a time sequence diagram of each signal provided by a control device for an electroluminescent touch-control display panel according to an embodiment of the present disclosure.

The GOA signal generally comprises a high level VGH signal, a low level VGL signal, a clock CLK signal, etc. In providing the GOA signal using the above control device, as shown in FIG. 3, during the display period, a normal GOA signal is provided, whereas during the touch-control period, a modulated square-wave signal is provided. For example, a VGL signal of −7V is loaded to a VGL port of the GOA circuit during the display period, whereas a square-wave signal benchmarked against −7V is loaded thereto during the touch-control period; a VGH signal of 7V is loaded to a VGH port of the GOA circuit during the display period, whereas a square-wave signal benchmarked against 7V is loaded thereto during the touch-control period; a CLK signal of ±7V is loaded to a CLK port of the GOA circuit during the display period, whereas a square-wave signal benchmarked against ±7V is loaded thereto during the touch-control period.

Optionally, in the above control device provided by an embodiment of the present disclosure, an amplitude of the second square-wave signal generated by the second modulation circuit 125 is the same as that of the first square-wave signal generated by the first modulation circuit 121.

For example, the first square-wave signal generated by the first modulation circuit 121 is a [0.5V] square-wave signal. The second modulation circuit 125 mainly consists of an operational amplifier, e.g., given VPP=5V as an input to the operational amplifier, the voltages of 9.5V and 4.5V are obtained after a series of operations. By means of a gating switch transistor, a second square-wave signal can thus be obtained with a benchmark of 7V and with an amplitude of 5V.

Optionally, in the above control device provided by an embodiment of the present disclosure, besides generating the GOA signal, the display driving circuit 111 in the display driving circuit board 110 is further required to provide a data Source signal to each pixel circuit in the electroluminescent touch-control display panel 200. In order to cause no interference between a data signal during the display period and a touch-control excitation signal during the touch-control period, the display driving circuit 111 only transmits the data signal to the data signal port of the pixel circuit in the electroluminescent touch-control display panel 200 during the display period, i.e., the Source signal is switched off in the OLED panel during the touch-control period.

Optionally, in the above control device provided by an embodiment of the present disclosure, a method for switching off the Source signal in the OLED panel during the touch-control period is: further configuring the enable signal generation circuit 123 to transmit, under the control of the synchronization signal transmitted by the display driving circuit 111, the first enable signal to the display driving circuit 111 via the switching circuit board 140 during the display period and the second enable signal to the display driving circuit 111 via the switching circuit board 140 during the touch-control period; configuring the display driving circuit 111 for transmitting the data signal to the data signal port of the pixel circuit in the electroluminescent touch-control display panel 200 upon receiving the first enable signal, and stopping transmitting the data signal to the data signal port of the pixel circuit in the electroluminescent touch-control display panel 200 upon receiving the second enable signal.

The above method is only one way to switch off the Source signal in the OLED panel during the touch-control period. Of course, it is also possible to configure the enable signal generation circuit 123 to transmit the first enable signal or the second enable signal directly to the electroluminescent touch-control display panel and directly control the receipt and switching-off of the data signal by using a switch transistor in the display panel.

Optionally, in the above control device provided by an embodiment of the present disclosure, during the touch-control period, in order to reduce the earth capacity between the touch-control excitation signal loaded to the cathode in the electroluminescent touch-control display panel and the second reference signal, the second reference signal provided by the lighting circuit board 130 needs to be modulated. Therefore, the second reference signal needs to be gated and modulated through the touch-control driving circuit board 120 before it can be transmitted to the second reference signal port corresponding to the pixel circuit in the electroluminescent touch-control display panel.

On such basis, in the above control device provided by an embodiment of the present disclosure, as shown in FIG. 2, the display driving circuit board 110 may further comprise: a third switching circuit 114; correspondingly, the touch-control driving circuit board 120 may further comprise: a third modulation circuit 127 and a third gating circuit 128.

The lighting circuit board 130 is further configured to provide a second reference signal to the third gating circuit 128 and the third modulation circuit 127 via the switching circuit board 140.

The enable signal generation circuit 123 is further configured to transmit, under the control of the synchronization signal transmitted by the display driving circuit 111, the first enable signal to the third gating circuit 128 during the display period and the second enable signal to the third gating circuit 128 during the touch-control period.

The third modulation circuit 127 is configured to generate a third square-wave signal benchmarked against a voltage of the second reference signal in accordance with the second reference signal and transmit the third square-wave signal to the third gating circuit 128.

The third gating circuit 128 is configured to: receive the second reference signal and the third square-wave signal and upon receiving the first enable signal, gate the second reference signal and then output the second reference signal to the third switching circuit 114 via the switching circuit board 140, and upon receiving the second enable signal, gate the third square-wave signal and then output the third square-wave signal to the third switching circuit 114 via the switching circuit board 140.

The third switching circuit 114 is configured to transmit the received second reference signal or third square-wave signal to the second reference signal port of the pixel circuit in the electroluminescent touch-control display panel 200.

In the above control device provided by an embodiment of the present disclosure, after generating the second reference signal VDD, the lighting circuit board 130 does not transmit it directly to the electroluminescent touch-control display panel 200, but to the touch-control driving circuit board 120 via the switching circuit board 140. As shown in FIG. 3, the second reference signal VDD is to be gated, during the display period, by the third gating circuit 128 and then transmitted to the second reference signal port of the pixel circuit in the electroluminescent touch-control display panel 200 via the third switching circuit 114, thereby realizing a normal display drive. The third modulation circuit 127 in the touch-control driving circuit board 120 modulates the second reference signal transmitted by the lighting circuit board 130 to generate a corresponding square-wave signal. The square-wave signal is to be gated, during the touch-control period, by the third gating circuit 128 and then transmitted to the second reference signal port of the pixel circuit in the electroluminescent touch-control display panel 200 via the third switching circuit 114. For example, in providing the second reference signal using the above control device provided by an embodiment of the present disclosure, a second reference signal of 4.6V is loaded to the second reference port of the pixel circuit during the display period, whereas a square-wave signal benchmarked against 4.6V is loaded thereto during the touch-control period.

In the above control device provided by an embodiment of the present disclosure, an amplitude of the third square-wave signal generated by the third modulation circuit 127 is the same as that of the first square-wave signal generated by the first modulation circuit 121.

Optionally, the first square-wave signal generated by the first modulation circuit 121 is a [0.5V] square-wave signal. The third modulation signal 127 mainly consists of an operational amplifier, and the voltages of 2.1V and 7.1V can be obtained through a series of operations by the amplifier. By means of a gating switch transistor, a third square-wave signal can thus be obtained with a benchmark of 4.6V and with an amplitude of 5V.

Optionally, the functions of the first switching circuit 112, the second switching circuit 113 and the third switching circuit 114 in the display driving circuit board 110 can be carried out using conducting wires. The functions of the first gating circuit 122, the second gating circuit 126 and the third gating circuit 128 in the touch-control driving circuit board 120 can be carried out using switch transistors.

Based on the same inventive concept, it is an embodiment of the present disclosure to provide a touch screen comprising: an electroluminescent touch-control display panel and a control circuit for the above-said electroluminescent touch-control display panel provided by an embodiment of the present disclosure; wherein, a cathode in the electroluminescent touch-control display panel is segmented into a plurality of touch-control electrodes arranged in arrays and independent from each other.

Based on the same inventive concept, it is also an embodiment of the present disclosure to provide a display device comprising the above-said touch screen provided by an embodiment of the present disclosure. The display device may be any product or component with a display function, such as a mobile phone, a tablet computer, a TV set, a display, a laptop, a digital photo frame, a navigator, etc.

From the above description of the implementations, those skilled in the art can clearly understand that the embodiments of the present disclosure may be implemented either by hardware or by software assisted by necessary common hardware platforms. For example, the technical solution according to the embodiments of the present disclosure may be embodied in the form of a software product that can be stored in a non-volatile storage medium (e.g., a CD-ROM, a U-disk, a mobile hard disk, etc.) which comprises a certain number of instructions for causing a computer device (e.g., a personal computer, a server, a network device, etc.) to execute the methods according to embodiments of the present disclosure.

Those skilled in the art can understand that the drawings are merely schematic diagrams for an optional embodiment, in which the modules or process flows are not necessarily indispensable to implement the present disclosure.

Those skilled in the art can understand that the modules in the device in an embodiment may be either distributed in the devices of the embodiment according to the description of the embodiment or located in one or more devices different from the present embodiment. The modules of the above-said embodiment may be either combined as one module or further divided into a plurality of sub-modules.

It is apparent that those skilled in the art can make various modifications and variations to the embodiments of the present disclosure without departing from the spirit and scope of the present disclosure. In this way, if these modifications and variations belong to the scope of the claims of the present disclosure or their equivalent technologies, the present disclosure is intended to include these modifications and variations.

The invention claimed is:

1. A control device for an electroluminescent touch-control display panel comprising: a display driving circuit board electrically connected to the electroluminescent touch-control display panel, a touch-control driving circuit board, a lighting circuit board, and a switching circuit board electrically connected respectively to the display driving circuit board, the touch-control driving circuit board and the lighting circuit board; wherein,
   the lighting circuit board is configured to provide a first reference signal to the touch-control driving circuit board via the switching circuit board;
   the touch-control driving circuit board is configured to gate, during the touch-control period, a generated touch-control excitation signal and then transmit the touch-control excitation signal to the display driving circuit board via the switching circuit board, and determine a position of touch control in the electroluminescent touch-control display panel in accordance with a feedback signal transmitted by the display driving circuit board, and gate, during the display period, the first reference signal provided by the lighting circuit board and then transmit the first reference signal to the display driving circuit board via the switching circuit board;
   the display driving circuit board is configured to during the touch-control period, transmit the excitation signal, transmitted by the touch-control driving circuit board, to a cathode multiplexed as a touch-control electrode in the electroluminescent touch-control display panel, and transmit a feedback signal received from the cathode multiplexed as the touch-control electrode in the electroluminescent touch-control display panel to the touch control driving circuit board via the switching circuit board, and during the display period, transmit the first reference signal, transmitted by the touch-control driving circuit board, to the cathode multiplexed as the touch-control electrode in the electroluminescent touch-control display panel.

2. The control device according to claim 1, wherein the display driving circuit board comprises a display driving circuit and a first switching circuit; and the touch-control driving circuit board comprises a first modulation circuit, a first gating circuit, an enable signal generation circuit and a touch-control detection circuit; wherein,
   the display driving circuit is configured to transmit a synchronization signal to the enable signal generation circuit via the switching circuit board;
   the enable signal generation circuit is configured to generate a first enable signal and a second enable signal, under the control of the synchronization signal transmitted by the display driving circuit board, transmit the first enable signal to the first gating circuit during the display period, and transmit the second enable signal to the first gating circuit during the touch-control period;
   the first modulation circuit is configured to generate a first square-wave signal as a touch-control excitation signal, and transmit the touch-control excitation signal to the first gating circuit;
   the first gating circuit is configured to receive the excitation signal and the first reference signal provided by the lighting circuit board, upon receiving the first enable signal, gate the first reference signal and then output the first reference signal to the first switching circuit via the switching circuit board and upon receiving the second enable signal, gate the touch-control excitation signal and then output the touch-control excitation signal to the first switching circuit via the switching circuit board;
   the first switching circuit is configured to forward the first reference signal or the touch-control excitation signal received from the first gating circuit to a first reference signal port connected to the cathode in the electroluminescent touch-control display panel, and forward a feedback signal, received from the first reference signal port connected to the cathode in the electroluminescent touch-control display panel, to the touch-control detection circuit via the switching circuit board;

the touch-control detection circuit is configured to determine a position of touch control in the electroluminescent touch-control display panel in accordance with the feedback signal.

3. The control device according to claim 2, wherein the display driving circuit board further comprises, a second switching circuit; and the touch-control driving circuit board further comprises a second modulation circuit and a second gating circuit; wherein the display driving circuit is further configured to transmit a (GOA signal to the second gating circuit and the second modulation circuit via the switching circuit board;

the enable signal generation circuit is further configured to under the control of the synchronization signal transmitted by the display driving circuit, transmit the first enable signal to the second gating circuit during the display period, and transmit the second enable signal to the second gating circuit during the touch-control period;

the second modulation circuit is configured to generate a second square-wave signal benchmarked against a voltage of the GOA signal in accordance with the GOA signal, and transmit the second square-wave signal to the second gating circuit;

the second gating circuit is configured to receive the GOA signal and the second square-wave signal, and upon receiving the first enable signal, gate the GOA signal and then output the GOA signal to the second switching circuit via the switching circuit board, and upon receiving the second enable signal, gate the second square-wave signal and then output the second square-wave signal to the second switching circuit via the switching circuit board;

the second switching circuit is configured to transmit the received GOA signal or the second square-wave signal to a signal port of a GOA circuit in the electroluminescent touch-control display panel.

4. The control device according to claim 3, wherein an amplitude of the second square-wave signal generated by the second modulation circuit is the same as that of the first square-wave signal generated by the first modulation circuit.

5. The control device according to claim 2, wherein the display driving circuit is further configured to transmit a data signal to a data signal port of a pixel circuit in the electroluminescent touch-control display panel during the display period only.

6. The control device according to claim 5, wherein the enable signal generation circuit is further configured to under the control of the synchronization signal transmitted by the display driving circuit, transmit the first enable signal to the display driving circuit via the switching circuit board during the display period, and transmit the second enable signal to the display driving circuit via the switching circuit board during the touch-control period;

the display driving circuit is configured to upon receiving the first enable signal, transmit the data signal to the data signal port of the pixel circuit in the electroluminescent touch-control display panel, and upon receiving the second enable signal, stop transmitting the data signal to the data signal port of the pixel circuit in the electroluminescent touch-control display panel.

7. The control device according to claim 2, wherein the display driving circuit board further comprises a third switching circuit; and the touch-control driving circuit board further comprises a third modulation circuit and a third gating circuit; wherein the lighting circuit board is further configured to provide a second reference signal to the third gating circuit and the third modulation circuit via the switching circuit board;

the enable signal generation circuit is further configured to under the control of the synchronization signal transmitted by the display driving circuit, transmit the first enable signal to the third gating circuit during the display period, and transmit the second enable signal to the third gating circuit during the touch-control period;

the third modulation circuit is configured to generate a third square-wave signal benchmarked against a voltage of the second reference signal in accordance with the second reference signal, and transmit the third square-wave signal to the third gating circuit;

the third gating circuit is configured to receive the second reference signal and the third square-wave signal, and upon receiving the first enable signal, gate the second reference signal and then output the second reference signal to the third switching circuit via the switching circuit board, and upon receiving the second enable signal, gate the third square-wave signal and then output the third square-wave signal to the third switching circuit via the switching circuit board;

the third switching circuit is configured to transmit the received second reference signal or third square-wave signal, to a second reference signal port of the pixel circuit in the electroluminescent touch-control display panel.

8. The control device according to claim 7, wherein, an amplitude of the third square-wave signal generated by the third modulation circuit is the same as that of the first square-wave signal generated by the first modulation circuit.

9. A touch screen comprising: an electroluminescent touch-control display panel, and a control circuit for the electroluminescent touch-control display panel according to claim 1 wherein, the cathode in the electroluminescent touch-control display panel is segmented into a plurality of touch-control electrodes arranged in arrays and independent from each other.

10. A display device comprising a touch screen according to claim 9.

11. The touch screen according to claim 9, wherein the display driving circuit board comprises a display driving circuit and a first switching circuit; and the touch-control driving circuit board comprises a first modulation circuit, a first gating circuit, an enable signal generation circuit and a touch-control detection circuit; wherein, the display driving circuit is configured to transmit a synchronization signal to the enable signal generation circuit via the switching circuit board;

the enable signal generation circuit is configured to generate a first enable signal and a second enable signal under the control of the synchronization signal transmitted by the display driving circuit board, transmitting the first enable signal to the first gating circuit during the display period, and transmitting the second enable signal to the first gating circuit during the touch-control period;

the first modulation circuit is configured to generate a first square-wave signal as a touch-control excitation signal, and transmit the touch-control excitation signal to the first gating circuit;

the first gating circuit is configured to receive the excitation signal and the first reference signal provided by the lighting circuit board, upon receiving the first enable signal, gate the first reference signal and then output the first reference signal to the first switching circuit via the switching circuit board, and upon receiving the second enable signal, gate the touch-control excitation signal and then output the touch-control excitation signal to the first switching circuit via the switching circuit board;

the first switching circuit is configured to forward the first reference signal or the touch-control excitation signal received from the first gating circuit to a first reference signal port connected to the cathode in the electroluminescent touch-control display panel, and forward a feedback signal, received from the first reference signal port connected to the cathode in the electroluminescent touch-control display panel, to the touch-control detection circuit via the switching circuit board;

the touch-control detection circuit is configured to determine a position of touch control in the electroluminescent touch-control display panel in accordance with the feedback signal.

12. The touch screen according to claim 11, wherein the display driving circuit board further comprises a second switching circuit; and the touch-control driving circuit board further comprises a second modulation circuit and a second gating circuit; wherein the display driving circuit is further configured to transmit a GOA signal to the second gating circuit and the second modulation circuit via the switching circuit board;

the enable signal generation circuit is further configured to under the control of the synchronization signal transmitted by the display driving circuit, transmit the first enable signal to the second gating circuit during the display period, and transmit the second enable signal to the second gating circuit during the touch-control period;

the second modulation circuit is configured to generate a second square-wave signal benchmarked against a voltage of the GOA signal in accordance with the GOA signal, and transmit the second square-wave signal to the second gating circuit;

the second gating circuit is configured to receive the GOA signal and the second square-wave signal, and upon receiving the first enable signal, gate the GOA signal and then output the GOA signal to the second switching circuit via the switching circuit board, and upon receiving the second enable signal, gate the second square-wave signal and then output the second square-wave signal to the second switching circuit via the switching circuit board;

the second switching circuit is configured to transmit the received GOA signal or the second square-wave signal to a signal port of a GOA circuit in the electroluminescent touch-control display panel.

13. The touch screen according to claim 12, wherein an amplitude of the second square-wave signal generated by the second modulation circuit is the same as that of the first square-wave signal generated by the first modulation circuit.

14. The touch screen according to claim 11, wherein the display driving circuit is further configured to transmit a data signal to a data signal port of a pixel circuit in the electroluminescent touch-control display panel during the display period only.

15. The touch screen according to claim 14, wherein the enable signal generation circuit is further configured to under the control of the synchronization signal transmitted by the display driving circuit, transmit the first enable signal to the display driving circuit via the switching circuit board during the display period, and transmit the second enable signal to the display driving circuit via the switching circuit board during the touch-control period;

the display driving circuit is configured to upon receiving the first enable signal, transmit the data signal to the data signal port of the pixel circuit in the electroluminescent touch-control display panel, and upon receiving the second enable signal, stop transmitting the data signal to the data signal port of the pixel circuit in the electroluminescent touch-control display panel.

16. The touch screen according to claim 11, wherein the display driving circuit board further comprises a third switching circuit; and the touch-control driving circuit board further comprises a third modulation circuit and a third gating circuit; wherein the lighting circuit board is further configured to provide a second reference signal to the third gating circuit and the third modulation circuit via the switching circuit board;

the enable signal generation circuit is further configured to under the control of the synchronization signal transmitted by the display driving circuit, transmit the first enable signal to the third gating circuit during the display period, and transmit the second enable signal to the third gating circuit during the touch-control period;

the third modulation circuit is configured to generate a third square-wave signal benchmarked against a voltage of the second reference signal in accordance with the second reference signal, and transmit the third square-wave signal to the third gating circuit;

the third gating circuit is configured to receive the second reference signal and the third square-wave signal, and upon receiving the first enable signal, gate the second reference signal and then output the second reference signal to the third switching circuit via the switching circuit board, and upon receiving the second enable signal, gate the third square-wave signal and then output the third square-wave signal to the third switching circuit via the switching circuit board;

the third switching circuit is configured to transmit the received second reference signal or third square-wave signal, to a second reference signal port of the pixel circuit in the electroluminescent touch-control display panel.

17. The touch screen according to claim 16, wherein, an amplitude of the third square-wave signal generated by the third modulation circuit is the same as that of the first square-wave signal generated by the first modulation circuit.

* * * * *